United States Patent [19]
Kennedy, Jr.

[11] Patent Number: 5,540,985
[45] Date of Patent: Jul. 30, 1996

[54] PROTECTIVE SHEET MATERIAL AND METHOD FOR MAKING SAME

[75] Inventor: Ted Kennedy, Jr., Ann Arbor, Mich.

[73] Assignee: The Trenton Corporation, Ann Arbor, Mich.

[21] Appl. No.: 401,810

[22] Filed: Mar. 10, 1995

[51] Int. Cl.⁶ .............................. D04H 1/08; B32B 9/00; B32B 31/00; B28B 3/20

[52] U.S. Cl. .................... 428/282; 156/155; 156/176; 156/244.11; 156/298; 264/176.1; 264/211.12; 264/248; 264/257; 427/416; 427/443; 428/280; 428/291

[58] Field of Search ................................... 156/155, 176, 156/244.11, 298; 264/176.1, 211.12, 248, 257; 428/280, 282, 291; 427/416, 443

[56] References Cited

U.S. PATENT DOCUMENTS

| | | | |
|---|---|---|---|
| 4,081,414 | 3/1978 | Abe et al. | 260/23.7 R |
| 4,086,116 | 4/1978 | Yazaki et al. | 156/205 |
| 4,762,750 | 8/1988 | Girgis et al. | 428/378 |
| 5,455,111 | 10/1995 | Velasquez Urey | 428/315.5 |

*Primary Examiner*—James Withers
*Attorney, Agent, or Firm*—Harness, Dickey, & Pierce, P.L.C.

[57] ABSTRACT

A protective sheet material of a laminate structure and a method of manufacture in which the sheet material has a plastic membrane layer joined to a layer of felt. Subsequent to the joining of the felt to the plastic membrane, the felt is saturated with petroleum wax including plasticizers and corrosion inhibitors. A second layer of felt can be joined to the opposite side of the plastic film to provide a sandwich of a plastic membrane between two layers of saturated felt. When this sheet material has been applied in an overlapping manner, there is a felt-to-felt seal at the overlap. The plastic and felt can be joined by heat fusion or by adhesives.

12 Claims, 2 Drawing Sheets

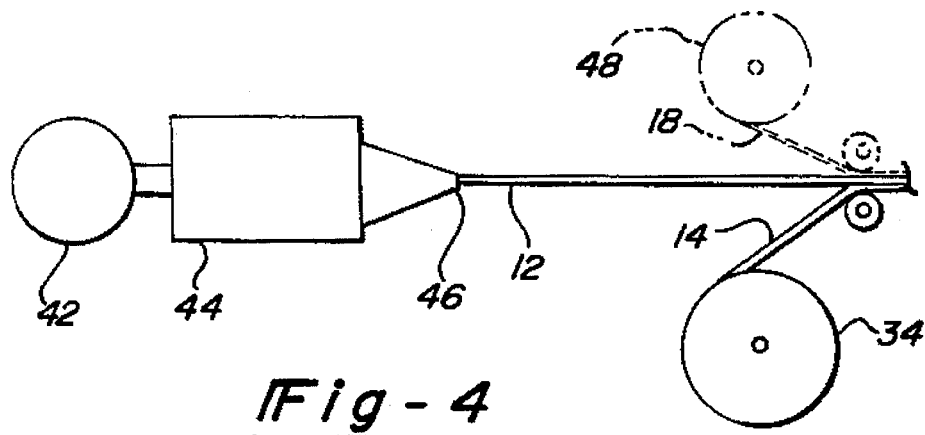
Fig-4
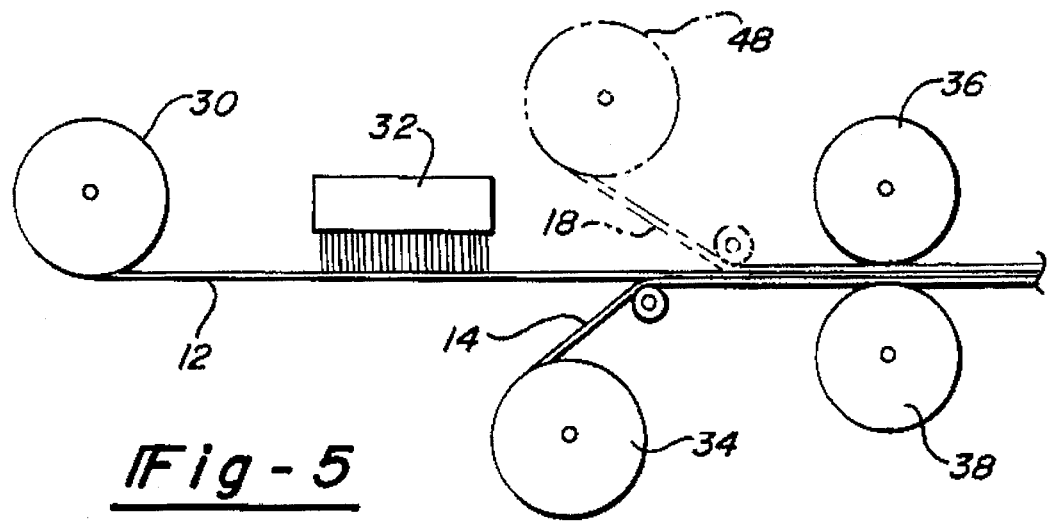
Fig-5
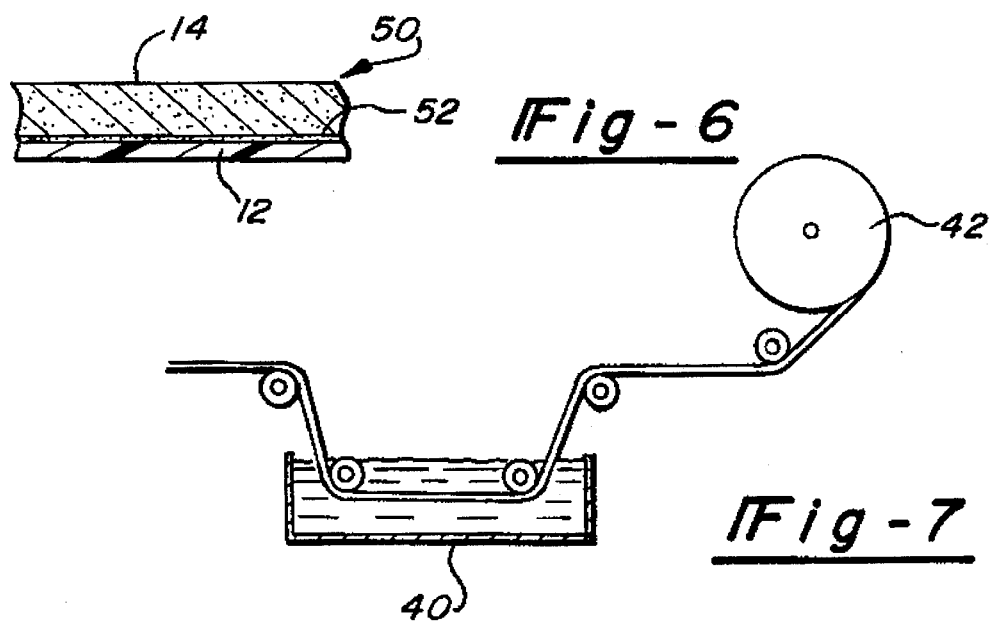
Fig-6
Fig-7

PROTECTIVE SHEET MATERIAL AND METHOD FOR MAKING SAME

BACKGROUND AND SUMMARY OF THE INVENTION

The present invention relates to a protective sheet material for use both above ground and below ground as well as to a method of making the material, and in particular, to a protective sheet material of a laminate structure having plastic and petroleum wax saturated felt layers.

Various structures, above ground and underground, require protection from corrosion resulting from a variety of causes. For example, underground metal structures such as pipelines require extensive protection from corrosion caused by moisture, chemicals and bacteria commonly found in soils. Various methods of protecting underground pipelines are used. One method is to wrap the pipeline with a wax tape composed of a synthetic fabric material, such as felt, saturated with a blend of petroleum wax, plasticizers and corrosion inhibitors. While wax tapes of this type provide the desired protection, in certain soils the saturant chemicals may gradually leach into the surrounding soil over time. This results in a gradual decrease in the corrosion protection.

In those instances where saturant leaching may occur, one way to prevent leaching is to use a multiple layer protective sheet having a plastic film membrane layer with a saturated felt layer on one side or a plastic film membrane between two layers of saturated felt. In use, the plastic membrane provides a cover for the felt and prevents leaching of the saturant chemicals. Furthermore, the plastic membrane also provides a permanent electrical barrier between the metal substructure and the contiguous soil. Existing protective materials of this type are made by first saturating the felt and then applying the plastic membrane to the felt. The membrane is held to the felt solely by the tackiness of the saturant chemicals in the felt. This does not securely hold the membrane on the felt, making installation of the protective material difficult, due to the easy separation of the felt and plastic.

The protective sheet material of the present invention also includes a felt layer and a plastic membrane. However, with the present sheet material, the felt and plastic membrane are heat fused together prior to the application of the saturant chemicals to the felt. As an alternative to heat fusion, an adhesive can be used to bond and hold the two layers together. Subsequent to the heat fusion or adhesive bonding of the layers, the felt is saturated with the petroleum wax, including corrosion inhibitors, plasticizers and/or bactericides. The result is a protective sheet material in which the plastic membrane and the felt cannot be easily separated from one another. The material is more durable and is thus easier to handle during the application process. The protective sheet material of the present invention is provided on rolls that can be several feet in width or as narrow as two or three inches.

The protective sheet material provides corrosion protection on the surface of underground structures. The protective sheet material also functions as a dielectric barrier to electrically insulate the underground structure.

In addition to covering underground pipelines, the sheet material of this invention can be used as a wrap for pilings, a waterproofing barrier beneath a highway pavement or on a foundation wall, and can be used as a landfill liner. Above ground applications include protecting a utility pole or the above ground portion of a piling, etc.

In one embodiment, the protective sheet material is formed with two layers, a plastic membrane layer and a felt layer.

In another embodiment, the protective sheet material is formed with a total of three layers, two layers of felt with the plastic membrane layer sandwiched between the felt layers. When this material is overlapped at a seam, a felt-to-felt seal is formed. However, the outer layer of the protective material will be saturated felt. This outer layer could be subjected to possible leaching of the saturant chemicals depending upon the soil type. This is not problematic, however, as the inner felt layer remains protected by the plastic to provide the desired corrosion protection.

While protective materials having a single layer of saturated felt and a layer of a plastic membrane with the two layers held together by the saturant chemicals are known in the art, a three layer protective material, having two layers of felt, is believed to be novel regardless of how it is manufactured.

Further objects, features and advantages of the invention will become apparent from a consideration of the following description and the appended claims when taken in connection with the accompanying drawings.

BRIEF DESCRIPTION OF THE DRAWINGS

FIG. 4 is a schematic elevational view illustrating one method of joining the felt and plastic layers;

FIG. 5 is a schematic view illustrating an alternative method of joining the felt and plastic layers;

FIG. 6 is a sectional view of an alternative embodiment of the protective sheet material of the present invention using an adhesive to bond the felt and plastic layers together; and FIG. 7 is a schematic view showing the joined felt and plastic layers being dipped in a tank to saturate the felt.

DETAILED DESCRIPTION OF THE PREFERRED EMBODIMENT

Figure 1:
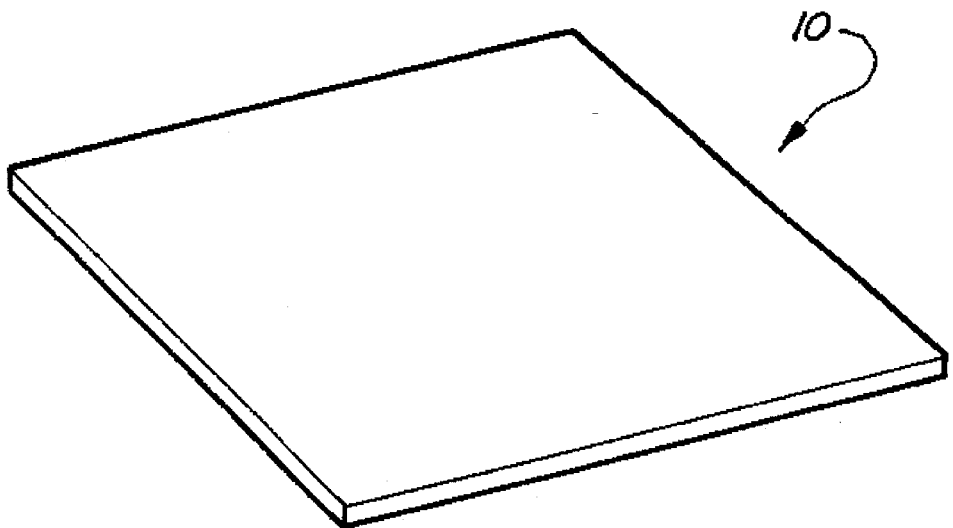
FIG. 1 is a perspective view of the protective sheet material of the present invention.

The protective sheet material of the present invention is shown in FIG. 1 and designated generally at 10. The protective sheet material 10 is typically provided in rolls. The rolls can be of any width—as large as several feet or as small as two or three inches, depending on the particular application. The narrow rolls are useful for ease of application when the sheet material is wrapped around irregularly shaped structures such as an underground pipeline fitting. The large width rolls are useful when the material is used as a landfill liner, a water barrier for a foundation or highway pavement or as a radiation barrier.

Figure 2:
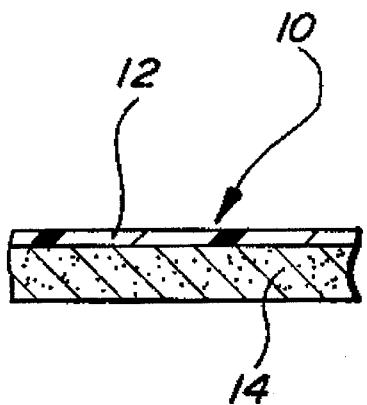
FIG. 2 is an enlarged sectional view illustrating the layer structure of the protective sheet material of the present invention.

With reference to FIG. 2, the laminate structure of the protective sheet material 10 is shown. The sheet 10 is formed with a first layer 12 of a plastic membrane and a second layer 14 of felt. A typical thickness of the plastic membrane is between 0.002 and 0.008 inches, while the felt layer is between 0.025 and 0.125 inches in thickness. It will be appreciated, however, that the invention is not limited to these material thicknesses. The felt is preferably a synthetic fabric but could be of natural fibers if desired.

Figure 3:
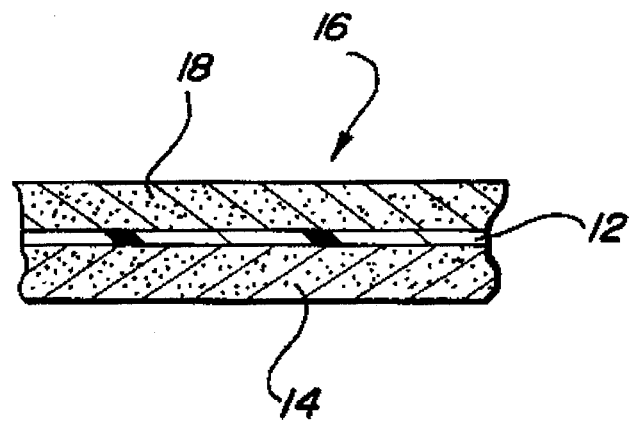
FIG. 3 is a sectional view illustrating the layer structure of an alternative embodiment of the protective sheet material of the present invention.

An alternative embodiment of the protective sheet material is shown in FIG. 3 and labelled generally at 16. The protective sheet material 16 is a three layer material having a plastic membrane 12 in the center, a layer 14 of the felt on one side of the plastic membrane 12 and another felt layer 18 applied to the other side of the plastic membrane.

The felt and plastic membrane layers of the sheet material are preferably joined together by a heat fusion process. With reference to FIG. 4, the heat fusion process is performed immediately upon exit of the plastic membrane from the die head 44 from which the membrane is extruded. The plastic is melted and delivered to the die head by a screw extruder 42 in a conventional manner for making a plastic film. As the membrane exits the die head outlet 46, the membrane 12 is in a heated state and is softened. The felt layer 14 is immediately brought into contact with the plastic membrane, heat fusing the two layers together. Pressure may or may not be necessary to help join the two layers together.

An alternative method of heat fusing the two layers is shown in FIG. 5. There, a previously formed plastic membrane 12 is provided on a roll 30. The plastic membrane is removed from the roll 30 and moved passed a heat source such as a radiant heater 32 to heat and soften the plastic. The felt layer 14, provided from a roll of felt 34, is then brought into engagement with one side of the heated plastic membrane 12. With the plastic membrane 12 in a softened state the two layers are heat fused together. The plastic and felt may also be passed between press rollers 36, 38 to press the plastic membrane and felt layer 14 together. The press rolls may also be used with the process shown in FIG. 4.

When making the three layer protective sheet material 16 shown in FIG. 3, the second layer of felt 18 is provided from a roll 48 as shown with broken lines in FIGS. 4 and 5. This second layer is brought into contact with the opposite side of the membrane from the felt layer 14 at the same time as or shortly after the first felt layer 14 is brought into contact with the plastic. The two felt layers 14, 18, may also be passed between the press rollers 36, 38 as shown in FIG. 5 to join both layers of felt to the plastic membrane simultaneously.

As an alternative to heat fusion, the protective sheet material can be made with an adhesive to join the plastic membrane to the felt. Such a protective sheet material is shown in FIG. 6 and labeled generally as sheet material 50. The sheet material 50 has a plastic membrane layer 12 and a felt layer 14 with an adhesive 52 between the felt and the plastic membrane. The adhesive 52 can be formed in a variety of ways. In one method, the adhesive 52 is rolled or sprayed onto one side of either the felt or the plastic membrane prior to engagement with the other. Alternatively, a sheet of pressure or heat sensitive adhesive is placed between the plastic membrane and the felt and subsequently activated by heat or pressure to bond the two layers together. In yet another embodiment, the adhesive can be applied as a double sided adhesive tape which is placed between the felt and plastic membrane layers.

Regardless of how the layers are joined, subsequent to the joining process, the plastic membrane and the felt are passed through a tank 40 (FIG. 7) containing petroleum wax and other saturant chemicals whereby the felt is saturated with the protective chemicals. The saturant chemicals consist mainly of a petroleum wax and may include corrosion inhibitors, plasticizers, biocides, and/or bactericides, etc. After saturating the felt, the protective sheet material is rolled, forming a roll 42. The sheet material can be further processed by cutting the sheet to the desired width.

A principal aspect of the present invention is the method of manufacturing a protective sheet material in which the felt layer or layers are joined to the plastic membrane prior to the felt being saturated. Another aspect of the invention is a three layer laminate structure, having two layers of felt on opposite sides of the plastic membrane. This material is believed to be novel, regardless of whether the layers are joined before or after the felt is saturated.

The protective sheet material of the present invention can be used in a variety of applications as described above, such as a protective wrap for underground pipelines, pipeline fittings, and pilings, as a liner for foundations, landfills, and roadway pavements, etc. and as a barrier to radiation. The protective sheet material may also be used in other applications where corrosion protection is desired. While the protective sheet material is advantageously used underground, it can also be used to protect above ground wooden, metal or concrete structures such as pilings and utility poles where desired.

It is to be understood that the invention is not limited to the exact construction illustrated and described above, but that various changes and modifications may be made without departing from the spirit and scope of the invention as defined in the following claims.

I claim:

1. A method of manufacturing a protective sheet material comprising the steps of:

providing a plastic membrane at an elevated temperature in which said membrane is softened;

bringing a layer of felt into engagement with a first side of said membrane to heat fuse said felt layer to said softened plastic membrane; and subsequently saturating said felt with a petroleum wax.

2. The method of claim 1 wherein said heated plastic membrane is provided by extruding a plastic resin film and heat fusing the felt layer to said membrane while said membrane is at an elevated temperature due to the extrusion process.

3. The method of claim 1 further comprising the step of bringing a second layer of felt into engagement with a second side of said plastic membrane while said plastic membrane is softened to heat fuse both felt layers to said plastic membrane and wherein both said layers of felt are subsequently saturated with the petroleum wax.

4. The method of claim 1 further comprising the step of applying pressure to said softened plastic membrane and said felt layer to assist in heat fusing the membrane to the felt layer.

5. The protective sheet material made by the process of claim 1.

6. The protective sheet material made by the process of claim 3.

7. The protective sheet material made by the process of claim 4.

8. A protective sheet material comprising:

a plastic membrane;

a first layer of felt heat fused to said plastic membrane on one side of said plastic membrane; and petroleum wax saturating said first layer of felt.

9. The protective sheet material of claim 8 further comprising:

a second layer of felt heat fused to said plastic membrane on an opposite side from said first felt layer; and petroleum wax saturating both said first and second layers of felt.

10. A protective sheet material comprising:

a plastic membrane;

a layer of felt on one side of said plastic membrane;

adhesive means between said plastic membrane and said felt layer to join said membrane to said felt layer; and petroleum wax saturating said felt layer.

11. The protective sheet material of claim 10 further comprising:

- a second layer of felt on a second side of said plastic membrane;
- a second adhesive means between said plastic membrane and said second felt layer to join said membrane to said second felt layer; and petroleum wax saturating both said layers of felt.

12. A protective sheet material comprising:

a plastic membrane;

a first layer of felt affixed to said plastic membrane on one side;

a second layer of felt affixed to said plastic membrane on an opposite side from said first felt layer; and petroleum wax saturating both said layers of felt.

* * * * *